INVENTORS
John M. West
Albert R. Snider
Frank Bevilacqua

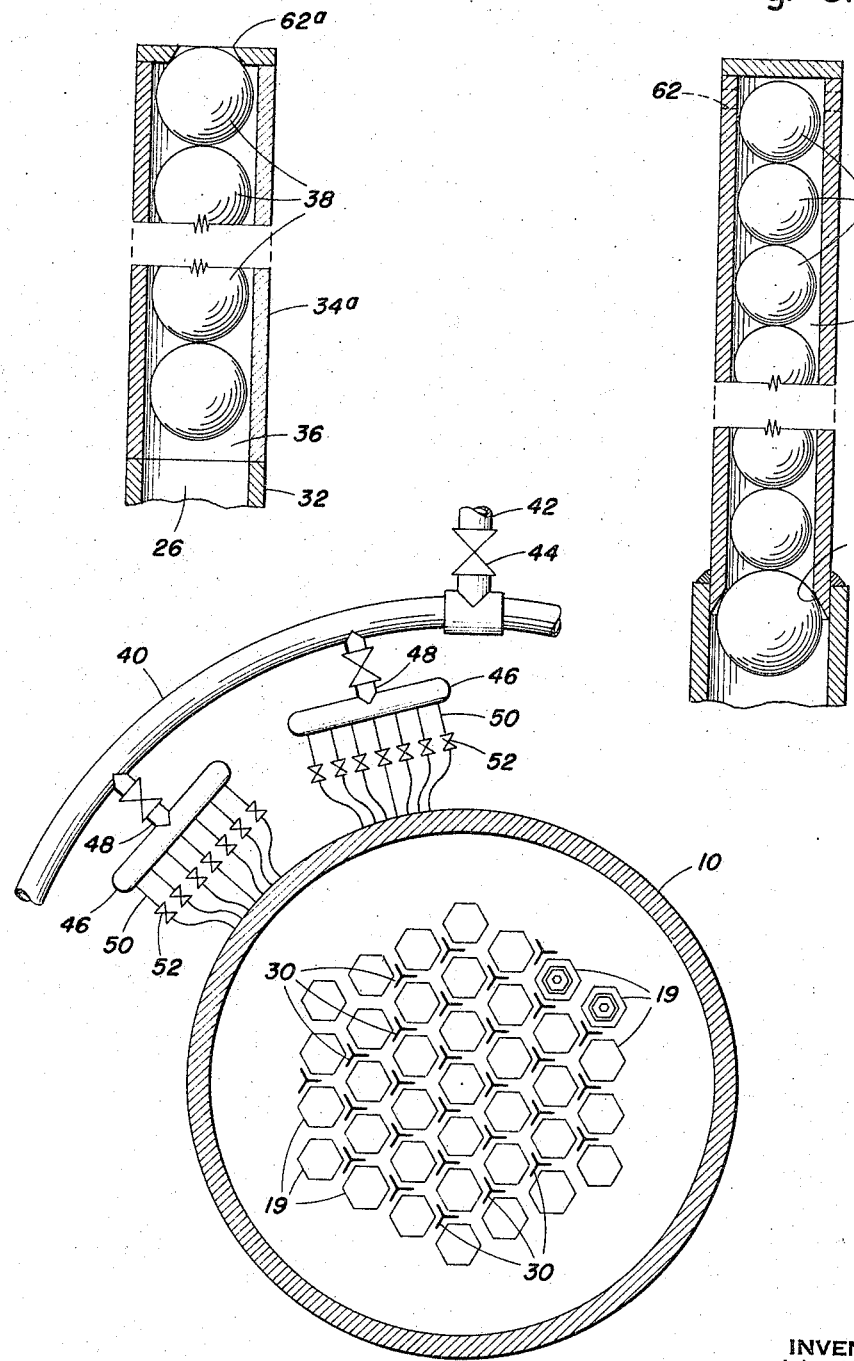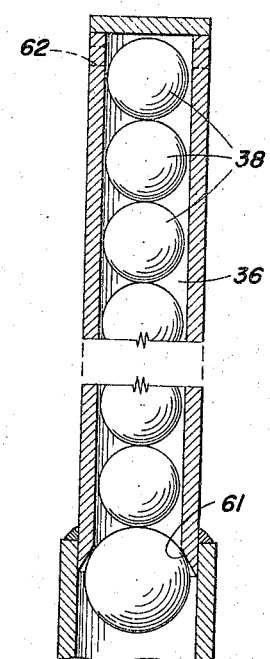

*Eldon H. Luther*
ATTORNEY

Oct. 17, 1967    J. M. WEST ETAL    3,347,747
CONTROL ORGANIZATION AND METHOD FOR A NUCLEAR REACTOR
Filed Dec. 15, 1960    4 Sheets-Sheet 4

INVENTORS
John M. West
Albert R. Snider
BY    Frank Bevilacqua

Eldon H. Luther
ATTORNEY

United States Patent Office 3,347,747
Patented Oct. 17, 1967

3,347,747
CONTROL ORGANIZATION AND METHOD
FOR A NUCLEAR REACTOR
John M. West, Dunedin, and Frank Bevilacqua, Clearwater, Fla., and Albert R. Snider, Windsor, Conn., assignors, by mesne assignments, to Combustion Engineering, Inc., a corporation of Delaware
Filed Dec. 15, 1960, Ser. No. 75,959
12 Claims. (Cl. 176—35)

This invention relates generally to nuclear reactors and has specific relation to an improved organization and method for controlling the reactivity in the core of such a reactor. In nuclear reactors which employ cores that are comprised of fuel members that are assembled in an arrangement to provide a critical mass, it is the practice to control these reactors, i.e., control the reactivity in the core, by means of movable poison members which may be adjusted with relation to the core. These poison members contain what is known in the art as a poison material, i.e., a material which has a relatively high neutron absorption cross-section. There are several such materials that are conventionally employed, with boron perhaps being the most widely used such material and numerous ways and means of effecting the necessary movement of these members have been proposed. Throughout this application it will be understood that the term "poison" refers to these neutron absorbing materials.

The present invention is directed to an improved, simple and economic arrangement and method of controlling the reactivity in the core of the reactor with the invention being concerned with providing a selective control of reactivity throughout restricted local areas of the core which areas collectively comprise generally the total transverse area of the core. By means of this local reactivity control this invention is particularly useful for reactor shimming and for fuel element failure detection as explained hereinafter.

Briefly stated, applicant's invention involves providing a number of laterally spaced vertical passageways in the region of the core and distributed throughout the area thereof. These passageways include a lower portion which extends generally throughout the height of the core and an upper portion which extends above the core into the reactor vessel. Positioned within and confined to each passageway is a movable means which contains a poison and which is movable from a lower position within the region of the core to an upper position in the passageway where it is positioned generally above the core. This poison containing means is moved by gravity from its upper to its lower position and is moved from its lower to its upper position by means of a fluid which is controllably directed upwardly in the passageway. In a hydrogenously cooled and/or moderated reactor this motivating fluid may be that employed for cooling and/or moderating purposes.

The admission of this fluid to each of the passageways is controlled so that the position of the poison material in each passageway is individually controlled with a suitable fluid and control distribution system being provided for this purpose. This individual control of the passing of the motivating fluid up through each passageway is essential in order to achieve the objective of the invention.

Accordingly, with the present invention, a selective control organization and method is provided which is simple and inexpensive as compared with conventional systems.

It is an object of the present invention to provide an improved method and system for controlling a nuclear reactor.

Other and further objects of the invention will become apparent to those skilled in the art as the description proceeds.

With the aforementioned objects in view, the invention comprises an arrangement, construction and combination of the elements of the inventive organization in such a manner as to obtain the results desired as hereafter more particularly set out in the following description of illustrative embodiments said embodiments being shown by the accompanied drawings wherein:

FIG. 3 is a diagrammatic and fragmentary showing of the organization of FIG. 1 with this FIG. 3 being in the nature of a transverse section;

FIG. 5 is a detailed illustration of the storage tube or chamber of the organization of FIG. 1;

FIG. 6 is an illustration similar to that of FIG. 5 but showing a modified type of construction;

Figures 1, 2:
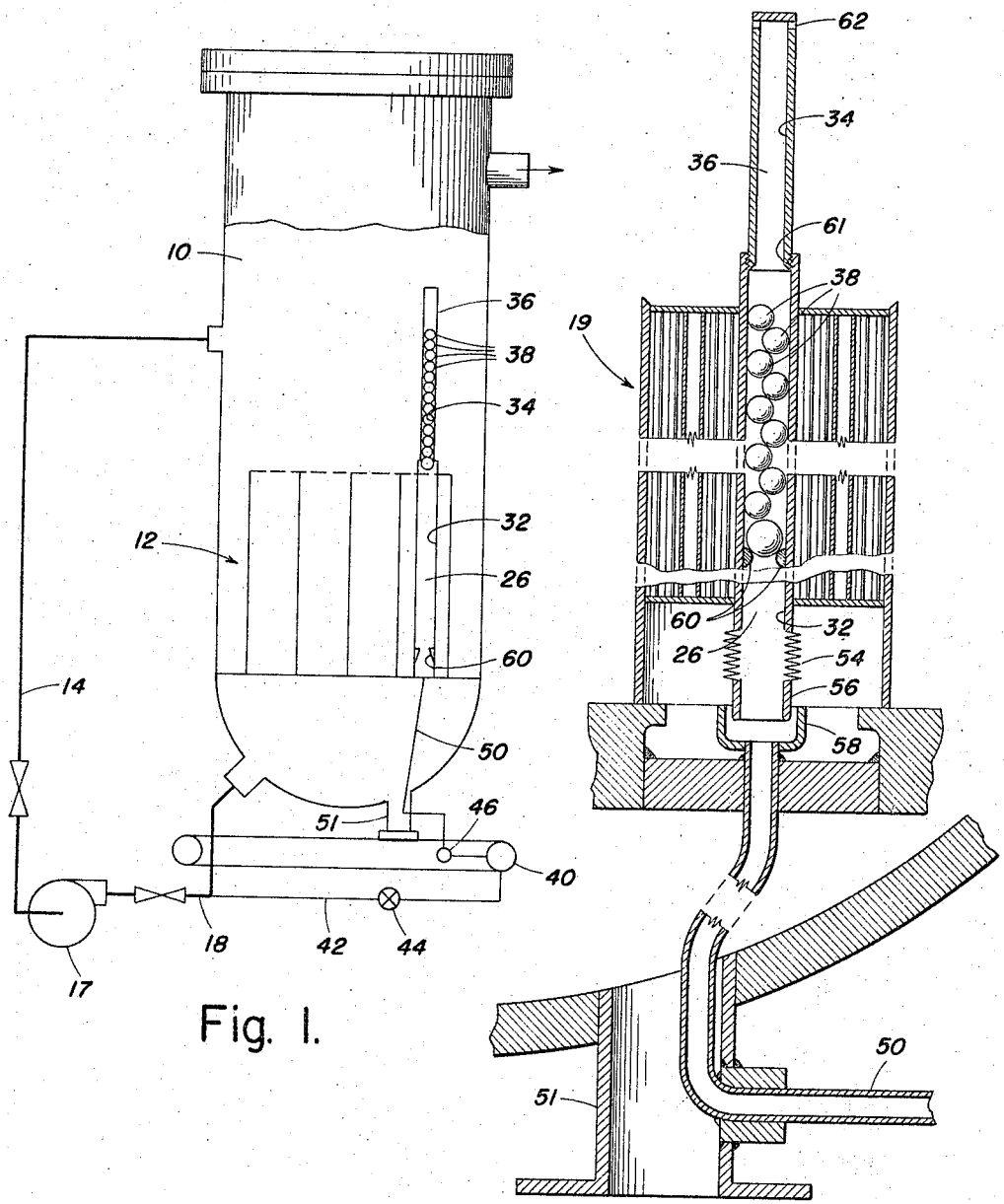
FIG. 1 is a digarammatic representation of a nuclear reactor employing the present invention.
FIG. 2 is a fragmentary detailed illustration of one of the fuel assemblies of FIG. 1 showing the centrally disposed passageways in the assembly and the connection of this passageway with a fluid supply tube.

Referring now to the drawing wherein like reference characters are used throughout to designate like elements, the illustrative and preferred embodiments of the invention, as depicted in FIG. 1, is shown employed with a boiling water nuclear reactor which includes a containment vessel 10 within which is retained the core 12 with water being forced up through the core and circulated through the vessel 10 by means of a suitable circulating system. This system includes a circulating pump 17 which has its inlet connected with the vessel 10 through conduit 14 as shown, and has its outlet connected with the vessel at a location below core 12 and by means of the conduit 18.

Figure 4:
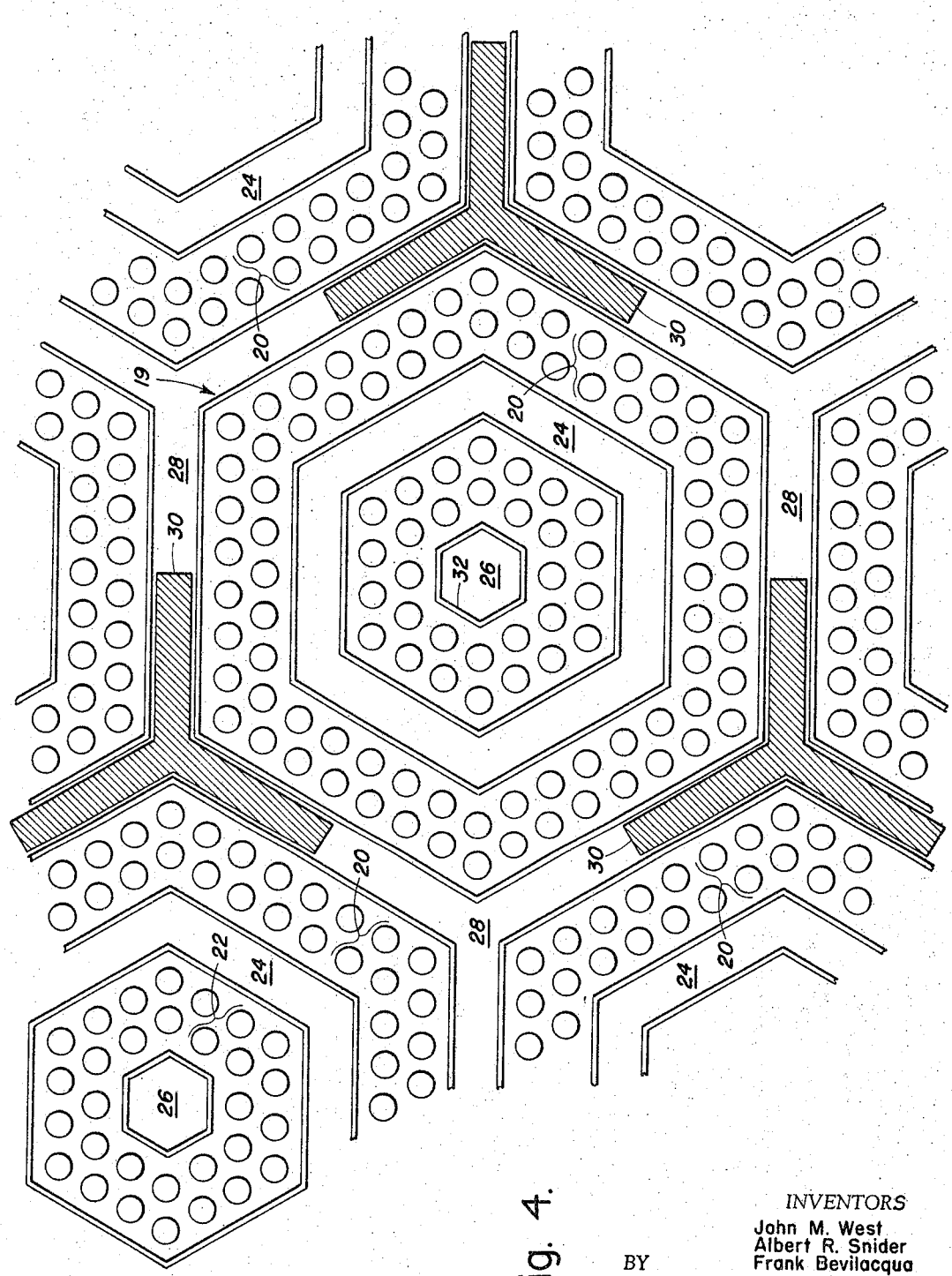
FIG. 4 is a detailed transverse sectional view of one of the fuel assemblies together with a portion of adjacent fuel assemblies showing the relation of the fuel assemblies to one another.

The reactor core is comprised of a plurality of separate fuel assemblies 19 (FIGS. 2 and 3) which may be individually removed from the core as desired and each of which assembly is comprised of a number of radially spaced perimetrically extending rows of fuel elements. As illustratively shown, these elements are in the form of tubes within which are retained a fissionable material. In the illustrative embodiment of FIGS. 1 through 4, the assemblies are hexagonal in transverse section with there being two annular or perimetrically extending pairs of rows 20 and 22 (FIG. 4). These rows 20 and 22 are separated by a passage 24 and inwardly of the pair of rows 22 is a passageway 26. The various fuel assemblies 19 are separated by channels 28. This partciular construction or configuration of fuel assembly provides relatively good power or neutron flux distribution over the area of the assembly as explained in detail in co-pending application Serial No. 14,723 filed March 14, 1960, now Patent No. 3,132,076.

In the illustrative organization, motor driven Y-shaped control rods 30 are shown positioned between the several fuel assemblies and accordingly being receivable in the passageway 28.

As embodied, the reactor is controlled, not only by means of control rods 30 but also by means of control means within the passageway 26 in each of the fuel assemblies. This passageway 26 is formed or defined by means of the tubular member 32 which extends throughout the length of the core and which may have any desired transverse configuration. Extending up from this tubular member is another tubular member 34 which forms a storage compartment 36 or passageway that is an extension of passageway 26 with this latter being defined as a control passageway and with laterally disposed openings 62 being provided at the upper end of member 34 for the exit of water passing up therethrough.

Positioned in and confined to the control passageway 26 and storage compartment 36 are a plurality of control members 38, with these members being illustrated in FIGURES 1 through 4 as being spherical. There are sufficient of the spherical members so that they occupy a height generally corresponding to the height of the core when in the control passage 26 or a desired predetermined height which may be any portion of the height of the core, and the storage chamber 36 is sufficiently large to contain generally the entire group of spherical control members. Each of these control members contains a nuclear poison, such as boron or cobalt, and the position of the members is controlled so as to control the reactivity in the core.

The control of the position of members 38 in each passage 26 is individually effected by means of controllably directing a fluid up this control passage 26. In the illustrative organization, of FIGS. 1 through 4, there is depicted a fluid distribution system for supplying each of the control passageways with such a fluid. As embodied this system includes distribution header 40 which is supplied with water through supply conduit 42. This supply conduit may conveniently be connected with or communicate with the outlet of pump 17 as a convenient source of water under sufficient pressure to elevate members 38 as desired. Alternatively it might be connected to the feedwater supply returning to the reactor from the main condenser in a nuclear power plant. The supply of water to header 40 is controlled by valve 44 and the water is conveyed from this header 40 to the various control passages 26 by means of the subheaders 46 which connect with header 44 through the valved connection 48 and from which extend the valved distribution tubes 50 with these tubes extending into vessel 10 through the wall of control rod thimbles 51.

The arrangement is such that there are a number of the subheaders 46 distributed about the lower region of the reactor and each of these subheaders has connected therewith a number of the distribution tubes 50 each of which tubes supplies the motivating fluid to a separate control passage 26 or to a predetermined group of such passageways. These tubes 50 are relatively small in diameter and accordingly may conveniently be admitted to the reactor vessel interior through the control rod thimbles 51 with one such thimble being required for each motor driven control rod. This is of importance since it obviates the necessity of providing additional openings in the pressure vessel wall with such openings being costly and requiring careful design because of stress considerations. However, it is obviously feasible to introduce the tubes through the pressure vessel wall in a number of other ways. It will be appreciated that the size of tube 50 with relation to thimble 51 depicted in FIG. 2 is exaggerated, with this being for the purpose of clarity and ease of illustration and explanation and with the tube actually being much smaller than the thimble.

Flow through the distribution tubes 50 is individually controlled by the valves 52 one of which is connected into each of the lines 50 as shown in FIG. 3. These valves 52 are of the on-off type and are preferably provided with a bypass flow. When the valve is open the full flow of fluid is permitted through the associated tube 50 and up through the central passage, while when the valve is closed only a relatively small or bleed flow is permitted through the associated tube 50. Each of the valves 52 is remotely controlled by an operator in the control room of the reactor and accordingly each is provided with a suitable motor or actuator, preferably electric, to operate the same. Since such actuator operated on-off valves with bleed passages may take a variety of forms details thereof are not illustrated.

The lower end of tubular member 32 is provided with a flexible bellows 54 (FIG. 2) which has extending from its lower end cylindrical member 56. This member extends into and engages the connector 58 that is secured to the outlet end of the distribution tube 50 with this relationship automatically taking place upon insertion of the removable control assembly into place in the reactor core and with the bellows being effective to bias member 56 into engagement with connector 58 while permitting a flat engagement of these elements. This engagement of member 56 with connector 58 provides a sufficiently fluid tight connection so that most of the water directed up into passage 26 from tube 50 will pass up through this passage. A small amount of leakage at the juncture member 56 with connector 58 is of no consequence. It will be appreciated that this is only one of many feasible ways of making the desired seal.

In accordance with the invention the poison spherical members 38 fall by gravity from storage chamber 36 into control chamber 26 when the control valve 52 is moved from its "on" to its "off" position. These spherical members are sufficiently heavy so that they will thus move by gravity even though there is a small upward flow of fluid through the chambers 26 and 36 as permitted by the bleed in the control valve and which flow is for the purpose of cooling these passages and the poison members 38 therein. This downward gravity descent of the spherical members is limited by the stops 60 which extend from the inner surface of the wall of tubular member 32 as shown in FIG. 2. The spherical members 38 are forced from their lower position within control chamber 26 into their upper position within storage chamber 36 by means of an upwardly directed flow of fluid from tube 50 through these chambers. Such movement of the control members is provided when the control valve 52 is moved from its closed or off position to its open or on position. This actuation of the control valve causes a full flow of the fluid through tube 50 as contrasted with the relatively small flow when the control valve is in its closed position with this increased or full flow being sufficient to elevate the control members 38 from chamber 26 into chamber 36.

In the illustrative arrangement of FIGS. 1 through 5 the lowermost spherical member 38 is of a greater diameter than the other spherical members. This is done in order that this larger member 38 may engage the seat 61 formed at the lower end of tubular member 38. The engagement of this enlarged spherical member with seat 61 is such as to restrict the upward flow of fluid through chambers 26 and 36 but not to completely stop such flow. The arrangement is such that with valve 52 open and the lowermost spherical member engaging seat 61 the spherical member will be retained in storage chamber 36 while a minor upward flow of fluid through these chambers is established. This minor flow provides for cooling of the passages and associated structure when the control members are retained in their upper position.

In operating the control system of the invention, the header 40 is supplied with water under pressure from pump 17 and this water is conveyed to each of the subheaders 46. The remotely controlled valves 52 are controlled so as to position the spherical poison members 38 as desired. When it is desired to move these members from their position within control chamber 26 to the storage chamber 36, the valve 52 associated with the particular group of spherical members 38 is opened so that a jet of water is directed up through the control passage 26. The spherical members 38 are thus moved into the storage chamber 36 and the lowermost member 38 engages seat 61. Valve 52 remains open to hold the spherical members in their uppermost position out of the active area of the core and a limited amount of water passes through the control passage 26 and out the openings 62 so as to cool this region of the core. It is noted that the lowermost or large diameter spherical member 38 may or may not contain a poison material. In certain environments, radiation damage may dictate that this large diameter ball have the poison omitted therefrom.

When it is desired to move the balls from their upper position in storage chamber 36 to their lower position within control chamber 26, valve 52 is closed with the cylindrical members falling by gravity downward into passage 26 and with a relatively small upward flow of water being maintained for cooling purposes. The fluid supply system for supplying the jet of water for upper movement of the valves is designed such that the flow and pressure conditions will allow adequate cooling of the pasageways and the operation of the members as desired.

The capacity of the system may be such that the control members in several of the passageways may be simultaneously moved from their lower control position to their upper inactive position or it may be that the control members may be so moved in only one control passageway at a time. Regardless of the capability of the system, individual control of each passageway or a predetermined group of passageways is provided in that the control members in each passageway can be positioned as desired with this being essential to the invention. By means of this individual control of the passages the reactor operator, from the reactor control room, can eject an individual shim column or a small group of shim columns dispersed throughout the core in a predetermined manner. This permits the invention to be employed to flatten the power distribution transversely of the core, i.e. provide a more uniform transverse power distribution, with such an effect being obtained by having the control members 38 remain in their lower or control position in passageways disposed in transverse regions of the core where the power density is high and in their upper inactive position in transverse regions where the power density is low. The operator can individually control each passageway or group of passageways to obtain the most uniform transverse power distribution. Furthermore, by means of the individual control of the many control passageways the invention may be utilized for locating a fuel element failure. The location of a ruptured or leaky fuel element may be determined by alternately injecting or expelling the poison from individual passageways or groups of passageways. The control members are successively moved into the inactive region and returned to the active region in one passageway or group of passageways at a time with the effluent from the reactor being monitored with respect to radioactivity during this time and with a sudden increase in radioactivity when the control members are thus moved out of a passageway indicating that the defective fuel element is in the vicinity of that passageway. In this respect, the location of each passageway in a removable assembly is of substantial advantage since the particular assembly with the defective element therein can be readily removed after its location is determined. Furthermore this removable assembly arrangement reduces manufacturing problems and allows pre-assembly of these subassemblies of the reactor core with the control members loaded in the passageways.

Accordingly, with the present invention individual control of the position of the control members in each passageway or a small group of passageways is provided with this control being effected entirely and solely through manipulation of the control valves 52 and with a simple economic arrangement resulting which is particularly well adapted for shimming purposes and for locating a fuel element failure.

To illustrate the general magnitude of an installation employing the improved control organization and method of this invention, the reactor core may have a vertical dimension of approximately 6 feet and tubular member 32 may have an inside dimension of approximately ⅞ of an inch and be fabricated of ⅛ inch thick Zircaloy-2 material. The storage tube 34, which extends upwardly from tubular member 32 and is interconnected therewith, may be 3 feet, 6 inches long, have an inside dimension of 11/16 of an inch and be fabricated of ⅛ inch thick stainless steel. The poison spherical members may be ⅝ inch in diameter and be fabricated of stainless steel containing 1 to 2% boron. There may be 72 such spherical members per fuel assembly so that the spherical members occupy a 3 feet height of the core. The lowermost spherical member may be 13/16 of an inch in diameter so that it will mate with the seat at the bottom of the storage tube. Each of the jet tubes 50 may be ½ inch stainless steel pipe and the initial flow required to eject the poison cylindrical members from the control passage 26 and into the storage chamber 36 may be fifteen gallons per minute, while when the lowermost or seal cylindrical member is in engagement with the seat 61, the flow may be reduced to about one gallon per minute.

In lieu of providing a larger spherical member at the bottom of the column of control members 38, each of the control members may be of the same diameter with this arrangement being shown in FIG. 6 and in this embodiment of the invention the poison spherical members 38 are held in the storage chamber 36 by a steady stream of water that passes up through control chamber 26 and the storage chamber 36 with this water passing out through the opening 65 at the upper end of the modified tubular member 34a and with the upper ball 38 making an imperfect seat with the rim of this opening. For this purpose opening 62a may be oblong or square.

As a practical matter, tubular members which form the storage chambers must be located within the vessel that houses the reactor core and in certain instances it will be desirable to have as small a distance as possible above the core occupied by these storage compartments.

Figure 7:
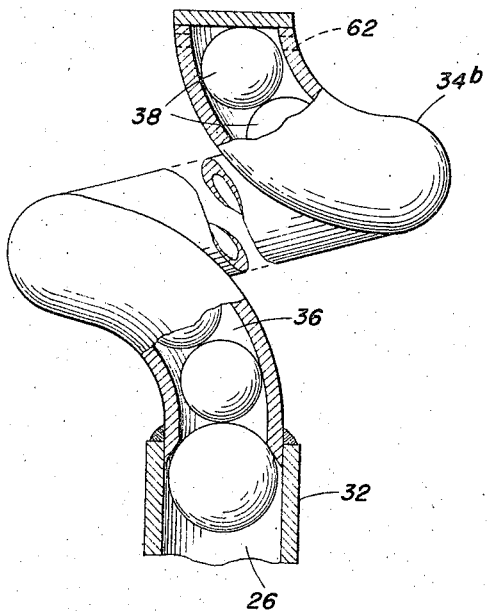
FIG. 7 is also a view similar to that of FIG. 5 but showing another modified construction.

Accordingly, in order to reduce the height of the storage compartment and still provide a compartment that will house the cylindrical members, this compartment may be formed as a spiral as shown in FIG. 7 wherein the storage tube 34b is spirally wound.

Figure 8:
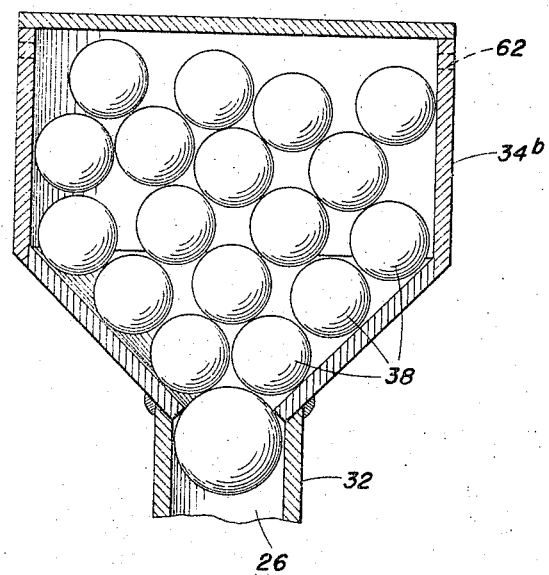
FIG. 8 is a further view similar to that of FIG. 5 but showing still another modified arrangement.

Alternatively, the storage compartment may be of the general form of a hopper as depicted in FIG. 8 wherein the storage tube member 34c has a substantially larger diameter than that of the control tube member 32 and is provided with tapered walls as shown. Both FIGS. 7 and 8 arrangements provide the necessary storage capacity at a reduced height as compared with that of the previously described embodiments.

It will be appreciated that the control channels may be located in the regions other than centrally of the fuel assemblies as illustrated in FIG. 1 although such location has certain advantages as mentioned hereinbefore. They may be placed in any location desirable for effecting control of the neutron flux in the reactor core.

Figure 9:
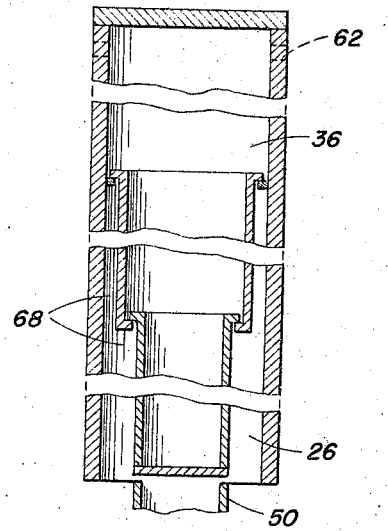
FIG. 9 is a view showing one of the control element storage passageways of the organization of FIG. 1 with a modified type of poison element or member being employed.
Figure 10:
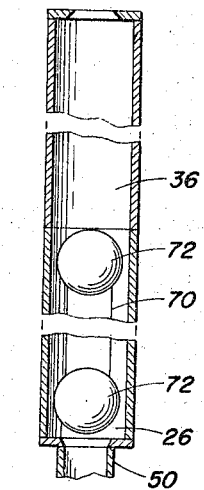
FIG. 10 is an illustration similar to that of FIG. 9 but showing still another modified construction for the poison containing means.

FIGURES 9 and 10 illustrate modified poison containing elements. In lieu of employing the spherical members 38 described in the previously referred to figures, the poison containing elements or members may be constructed in the form of telescoping tubular members 68 shown in FIG. 9. These members may occupy the position illustrated in this figure when extending into the control chamber 26 and will be forced upwardly into storage chamber 36 by means of an upward jet of fluid from tube 50 with the lower member 68 being telescoped up into the upper member when moved into the storage chamber 36.

FIG. 10 illustrates a modified poison containing arrangement wherein the poison containing member is in the form of a rod 70 having a guide ball 72 secured to each of its ends. The rod 70 is illustrated in its lower position where it is disposed within the control chamber 26 and this organization, the same manner as the cylindrical members 38, is moved to its upper position in storage chamber 36 by means of a jet of fluid introduced upwardly into chamber 26 from tube 50.

While the invention has been illustratively disclosed and described in connection with a boiling water reactor, it is to be understood that it may be employed with other and different types of reactors and that the operating medium for moving the poison containing members from their lower position in the region of the core to their upper storage position out of the active core region, can be a liquid or a gas of a characteristic which is dictated by the design requirements of the particular reactor into which the control system is placed. The medium that is most practical and economical for reactors cooled and/or moderated by hydrogenous materials, is water or steam. While the supply of this operating medium in reactors of this type may be taken from the system that supplies this medium to the ractor, the control of the fluid supply to each of the control arrangements for positioning the poison members as desired in independent of the flow of this medium through the reactor core. Alternatively, in lieu of obtaining the fluid for operating the control system from the reactor cooling system, it may be obtained from a separate system entirely.

Accordingly, it will be evident that with the improved control organization and method of this invention, a relatively uncomplicated reactor control is provided which may be employed for either complete or supplemental control of the reactor or for improving the power distribution in the reactor core.

While we have illustrated and described preferred embodiments of the invention, it is to be understood that such is merely illustrative and not restrictive and that variations and modification may be made therein without departing from the spirit and scope of the invention. We, therefore, do not wish to be limited to the precise details set forth but desire to avail ourselves of such changes as fall within the scope of the invention.

What is claimed is:

1. In a thermal nuclear reactor a core disposed within a suitable vessel and through which a cooling fluid is directed, a plurality of elongated housing members in the core and extending thereabove providing a plurality of independent passageways having a lower portion in the region of the core and an upper portion above the core, separate means operative to convey a fluid up through each passageway, each of said separate means including means effective, per se, to control this fluid flow through each passageway, this last named means having a first position wherein it is effective to establish a full flow of the fluid up through the passageway and a second position where it is effective to provide only a much decreased flow of the fluid up through the passageway, movable means confined in each of said passageways but movable between the upper and lower portion thereof and being capable of being generally wholly contained in either the upper or lower portions, said movable means containing a material that has a high neutron absorption cross section and being moved by gravity into said lower portion when said decreased flow condition prevails but moved into said upper portion when said full flow condition prevails.

2. In a thermal nuclear reactor a core disposed within a suitable vessel, and through which a cooling fluid is directed, a plurality of elongated housing members in the core and extending thereabove providing a plurality of independent passageways having a lower portion in the region of the core and an upper portion above the core, each of said passageways having confined therein means movable between the upper and lower portions and containing a material that has a high neutron absorption cross section, said means being moved into the lower portion of the passageway by gravity and into the upper portion by upward flow of fluid, means for conveying a fluid up through each passageway including a manifold means, a separate conduit means leading from the manifold into the vessel for each passageway and operative to direct a fluid upwardly therethrough, separate valve means associated with each conduit means and operative per se to control the positioning of the movable means in the passageway, said valve means having an open position where a full flow of fluid through the conduit means to and up through the passageway is permitted and a closed position where such flow is substantially decreased but a limited upward flow through the passageway is retained, the movable means being moved from the lower into the upper position by said full flow and moved by gravity from the upper portion to the lower portion when the valve is closed and only said limited flow is permitted.

3. The organization of claim 2 wherein said movable means comprises a plurality of separate discrete members disposed in each passageway.

4. The organization of claim 2 wherein said movable means comprises an elongated member extending longitudinally of the passageway with enlarged guide portions at the upper and lower ends and a reduced intermediate portion.

5. The organization of claim 2 wherein the movable means comprises a plurality of internested telescoping means which occupy an extended position when in the lower portion of the passageway and an internested telescoped position when in the upper portion of the passageway.

6. The organization of claim 2 wherein the reactor core is comprised of a plurality of separately removable vertical fuel assemblies retained in parallel spaced relation, each of the assemblies having a plurality of vertical, elongated fuel elements arranged in a continuous perimetrically extending path and encompassing a substantial space, this space in at least some of the assemblies providing the passageways for the movable means.

7. In a thermal nuclear reactor, a core disposed within a suitable vessel and through which a cooling fluid is directed, said core having a plurality of movable control rods disposed therein and said pressure vessel having a thimble in the wall thereof for each control rod, a plurality of elongated housing members in the core and extending thereabove providing a plurality of independent passageways having a lower portion in the region of the core and an upper portion above the core, means operative to convey a fluid up through each passageway from a source and including a separate conduit communicating with the source of fluid and leading into the vessel to each passageway, said conduits entering the vessel through the several thimbles provided therein for the control rods, remotely operable means connected into each conduit and effective, per se, to control the flow therethrough and through the housing member, this last named means having a first position wherein it is effective to establish a full flow of the fluid up through the passageway and a second position where it is effective to provide only a reduced flow of the fluid up through the passageway, movable means confined in each of the passageways but movable between the upper and lower portion thereof and being generally wholly contained in either the upper or lower portions, said movable means containing a material that is effective to vary the reactivity of the reactor when it is moved from the lower to the upper portion of the passageway and being moved by gravity into said lower portion when said decreased flow condition prevails but moved into said upper position when said full flow condition prevails.

8. A thermal nuclear reactor cooled and moderated by a hydrogenous fluid and comprising a core disposed within a suitable vessel, a circulating system for circulating said fluid through said core, a plurality of elongated housing members in the core and extending thereabove, providing a plurality of independent passageways having a lower portion in the region of the core and an upper portion above the core, each of said passageways having confined therein means movable between the upper and lower portions and containing a material such that the reactivity of the reactor varies as a result of such movement, said means being moved into the lower portion by gravity and into the upper portion by upward flow of fluid, means operative to convey and independently control the flow of said hydrogenous fluid up through each of said passageways, this last named means comprising a header, said header communicating with the circulating system to receive said hydrogenous fluid under pressure therefrom, a separate conduit leading to each passageway and receiving fluid from said header, separate valve means associated with each conduit means and operative per se to control the positioning of the movable means in the passageway, said valve means having an open position where a full flow of fluid through the conduit means to and up through the passageway is permitted and a closed position where such flow is substantially decreased but a limited upward flow through the passageway is retained, the movable means being moved from the lower into the upper portion by said full flow and moved by gravity from the upper portion to the lower portion when the valve is closed and only said limited flow is permitted.

9. A thermal nuclear reactor cooled and moderated by a hydrogenous fluid and comprising a core disposed in a suitable pressure vessel, said core having a plurality of separately removable vertically disposed fuel assemblies extending generally throughout the height of the core, each such assembly including a plurality of vertical, elongated fuel elements arranged to encompass a substantial space centrally of the assembly, a housing member disposed in and extending longitudinally of this space in at least some of these assemblies providing a plurality of independent passageways having a lower portion in the region of the core and an upper portion above the core each of said passageways having confined therein means movable between the upper and lower portions and containing a material that has a high neutron absorption cross section, said means being moved into lower portion of the passageway by gravity and into the upper portion by upward flow of fluid, means for conveying a fluid up through each passageway including a manifold means, a separate conduit means leading from the manifold into the vessel for each passageway and operative to direct a fluid upwardly therethrough, separate valve means associated with each conduit means and operative per se to control the positioning of the movable means in the passageway, said valve means having an open position where a full flow of fluid through the conduit means to and up through the passageway is permitted and a closed position where such flow is substantially decreased but a limited upward flow through the passageway is retained, the movable means being moved from the lower into the upper portion by said full flow and moved by gravity from the upper portion to the lower portion when the valve is closed and only said limited flow is permitted.

10. The organization of claim 9 wherein the lower end of the housing and the upper end of the conduit means are in releaseable engagement with one of these ends being provided with a flexible connection for the purpose of permitting accurate alignment.

11. A thermal nuclear reactor cooled and moderated by a hydrogenous fluid and comprising a core disposed in a suitable pressure vessel, a circulating system for circulating fluid through said core, said core having a plurality of separately removable vertically disposed fuel assemblies extending generally throughout the height of the core, each such assembly including a plurality of vertical, elongated fuel elements arranged to encompass a substantial space, centrally of the assembly, a housing member disposed in and extending longitudinally of this space in at least some of these assemblies providing a plurality of independent passageways having a lower portion in the region of the core and an upper portion above the core, each of said passageways having confined therein means movable between the upper and lower portions and containing a material such that the reactivity of the reactor varies as a result of such movement, said means being moved into the lower portion by gravity and into the upper portion by upward flow of fluid, means operative to convey and independently control the flow of said hydrogenous fluid up through each of said passageways, this last named means comprising a header coaxial of the reactor vessel and extending thereabout at the lower region thereof, said header communicating with the circulating system to receive said hydrogenous fluid under pressure therefrom, a separate conduit leading to each passageway and receiving fluid from said header, separate valve means associated with each conduit means and operative per se to control the positioning of the movable means in the passageway, said valve means having an open position where a full flow of fluid through the conduit means to and up through the passageway is permitted and a closed position where such flow is substantially decreased but a limited upward flow through the passageway is retained, the movable means being moved from the lower into the upper portion by said full flow and moved by gravity from the upper portion to the lower portion when the valve is closed and only said limited flow is permitted.

12. The method of controllably varying the reactivity, in the core of a reactor comprising providing laterally spaced control passageways in the region of the core, positioning discrete poison members in these passageways, independently or in small predetermined groups and controllably directing a fluid up through each of the passageways at sufficient rate to move the poison members upwardly therein to a region above the core, when desired, retaining said members above the core by this upwardly directed fluid in the passageways, and returning said members to any particular passageway when desired by lowering the flow of fluid therethrough and providing a gravity descent of the members thereinto and retaining a flow of fluid up through the passageways at all times.

References Cited

UNITED STATES PATENTS

| | | | |
|---|---|---|---|
| 2,852,458 | 9/1958 | Dietrich et al. | 204—193.3 |
| 2,900,316 | 8/1959 | Kaufmann et al. | 204—193.3 |
| 2,936,273 | 5/1960 | Untermyer | 204—193.3 |
| 2,937,984 | 5/1960 | Chapellier | 204—193.3 |
| 2,990,356 | 6/1961 | Chapellier | 204—193.3 |
| 3,207,668 | 9/1965 | West | 176—22 |
| 3,231,473 | 1/1966 | Hennig | 176—36 |

FOREIGN PATENTS

| | | |
|---|---|---|
| 612,009 | 1/1961 | Canada. |
| 1,052,000 | 3/1959 | Germany. |
| 756,014 | 8/1956 | Great Britain. |

OTHER REFERENCES

Proceedings of the 1st Geneva Conf., 1955, vol. 3 pp. 214 and 218, Publ. by the U.N., New York.

BENJAMIN R. PADGETT, *Primary Examiner.*

ROGER L. CAMPBELL, REUBEN EPSTEIN, CARL D. QUARFORTH, L. DEWAYNE RUTLEDGE,
*Examiners.*

J. F. DAVIS, M. R. DINNIN, H. E. BEHREND,
*Assistant Examiners.*